(No Model.)
J. C. WYGANT.
POST HOLE DIGGER.
No. 370,514. Patented Sept. 27, 1887.
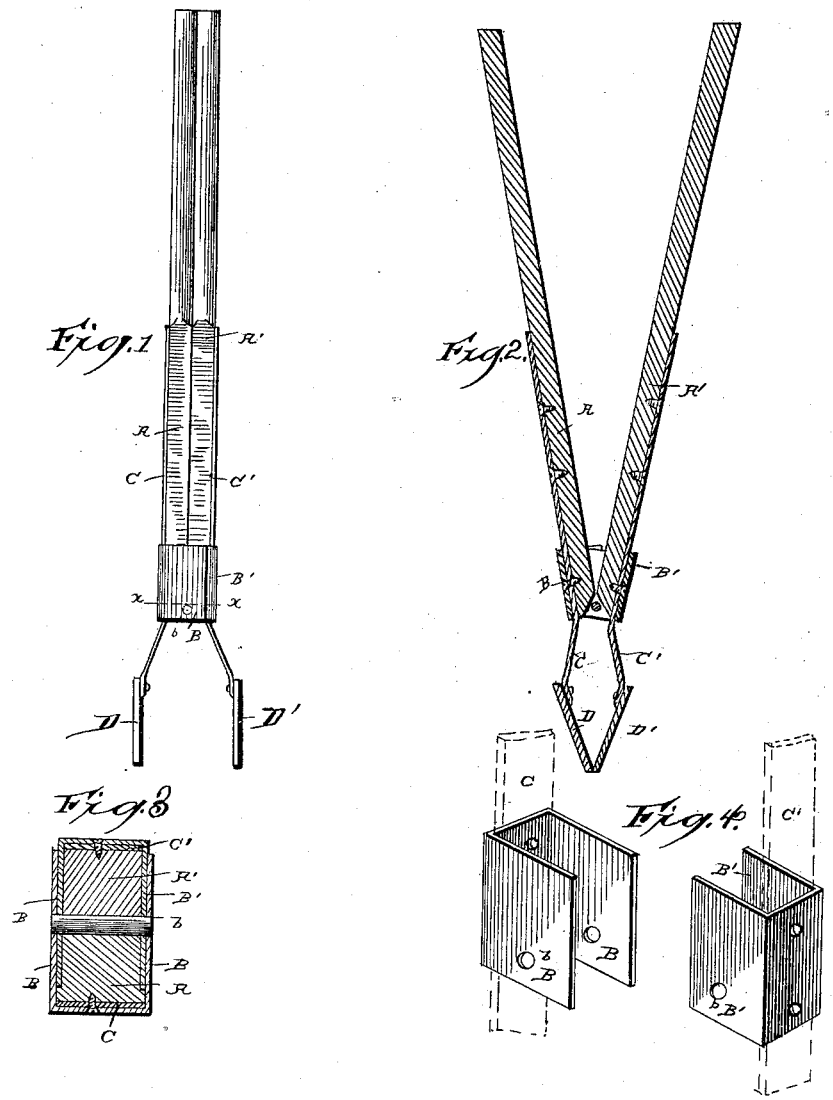
Witnesses
Henry G. Dieterich
O. E. Doyle
Inventor
John C. Wygant
By his Attorneys
C. A. Chowder

UNITED STATES PATENT OFFICE.

JOHN C. WYGANT, OF OUTVILLE, OHIO, ASSIGNOR OF ONE-HALF TO JAMES D. STEWART, OF SAME PLACE.

POST-HOLE DIGGER.

SPECIFICATION forming part of Letters Patent No. 370,514, dated September 27, 1887.

Application filed June 15, 1887. Serial No. 241,394. (No model.)

*To all whom it may concern:*

Be it known that I, JOHN C. WYGANT, a citizen of the United States, residing at Outville, in the county of Licking and State of Ohio, have invented a new and useful Improvement in Post-Hole Diggers, of which the following is a specification.

My invention relates to an improvement in post-hole diggers; and it consists in a certain novel construction and arrangement of parts, fully set forth hereinafter, and specifically pointed out in the appended claim.

In the annexed drawings, Figure 1 is a side view of the device. Fig. 2 is a longitudinal section. Fig. 3 is a transverse section on the line $x\ x$ of Fig. 1. Fig. 4 is a detail view showing the parts of the hinge detached.

Referring by letter to the drawings, A A' designate the handles of the digger. To the lower end of the handle A is attached a U-shaped strap, which passes around three sides thereof and projects outwardly at the ends to form the parallel ears B B, and to the lower end of the handle A' is attached a similar strap, forming the ears B' B', which are set somewhat wider apart than the ears B B, to pass on the outsides thereof. The ears B B' are pivoted together at *b* near the lower ends by a pin passing through aligned openings therein, and it will be seen that as the handles are rigidly secured to the straps they will thus be pivoted together.

C C' designate the shanks, which are secured to the outsides of the handles, project below the lower ends of the same, and are curved outwardly, as seen in the drawings, to provide more space between the lower ends thereof. The said shanks pass through and are partly held in place by the straps before mentioned.

D D' designate the shovels, which are attached to the lower ends of the shanks C C' and are curved in cross-section. The lower edges of the said shovels are made straight, so as to enable dirt to be more easily raised thereby from the bottom of a hole. It will be understood that when the shovels are pointed or rounded at the lower edges all the material cannot be raised from the hole which is being formed without great trouble to the operator.

The manner of operating the digger is obvious, as tools of the kind have been heretofore used.

The construction of the implement is very simple, and it will be readily seen that provided with the hinge herein described there is no liability of the handles becoming loose and thus interfering with the proper use of the tool. The ears on the handles are made sufficiently long to enable them to be in contact when the handles are at their greatest extension as well as when they are closed, thus bracing the said handles at all points of their motion. The said ears are, in fact, guides to prevent all lateral motion of the handles and allow only a forward and backward motion thereof.

The curve formed in the shanks C C' allows the lower edges of the shovels to be closed together, while the upper edges are some distance apart, thus providing considerable space between the said shovels to contain earth taken from the post-hole.

The ears herein described need not be formed as part of the strap, as set forth, but may be formed separately and secured to the sides of the handles, or they may, if the handles are of metal, be formed integral therewith. When the handles are closed together, it will be seen that the edges of the ears B pass in between the ears B' and the sides of the handle, or in grooves formed in the handles for their reception, thus locking the handles firmly together and allowing only the forward and backward motions before mentioned.

I am aware that it is not new to provide post-hole diggers having the pivoted handles and shovels attached to the lower ends thereof, and I therefore do not claim this broadly; but I am not aware that heretofore diggers have been provided with a hinge, as herein described, having the extended ears to overlap and slide on each other to prevent lateral play of the handles, or that the details of construction as herein set forth have been used, as the ears formed as part of a strap which passes around the handle, the curved shank passed under or through the said strap, which is designed to hold it in place, and the ears pivoted together at the lower ends, with the inner edges of the inner ears adapted to fit into grooves in the handles when the said handles are closed together.

The operation of this device is similar to that of other implements of the kind heretofore made. The handles are held together, thus separating the blades or shovels and the latter are pressed down into the ground. The handles are now drawn apart, thus compressing the earth between the shovels and then the device is raised, carrying the earth between them out of the hole. The operation is very simple, and the construction of the device is such as to make it very strong and durable.

Having thus described the construction of my invention, what I claim, and desire to secure by Letters Patent, is—

In a post-hole digger, the combination of the handle A, ears B B on the lower end thereof, formed of a U-shaped piece of metal, the handle A', ears B' B' thereon, wider than the ears B B and formed of a U-shaped piece of metal, the ears B' embracing the ears B and pivoted thereto, and the shanks C C', secured on the outer sides of the handles and passing through and secured in place by the ears, the lower ends of the said shanks being curved outwardly and the shovels attached to the lower ends of the curved shanks, substantially as specified.

In testimony that I claim the foregoing as my own I have hereto affixed my signature in presence of two witnesses.

JOHN C. WYGANT.

Witnesses:
J. D. STEWART,
E. O. ANISON.